(No Model.) 2 Sheets—Sheet 1.

J. W. RUGER.
MACHINE FOR MOISTENING DOUGH.

No. 558,987. Patented Apr. 28, 1896.

Witnesses:
Emil Neuhart.
Friedrich, Gustav, Wilhelm.

J. W. Ruger Inventor.
By Wilhelm Bonner
Attorneys.

(No Model.) 2 Sheets—Sheet 2.
J. W. RUGER.
MACHINE FOR MOISTENING DOUGH.
No. 558,987. Patented Apr. 28, 1896.
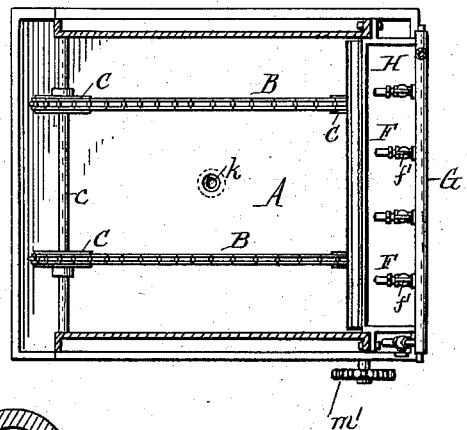
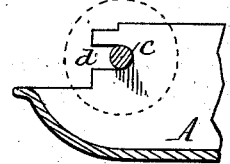
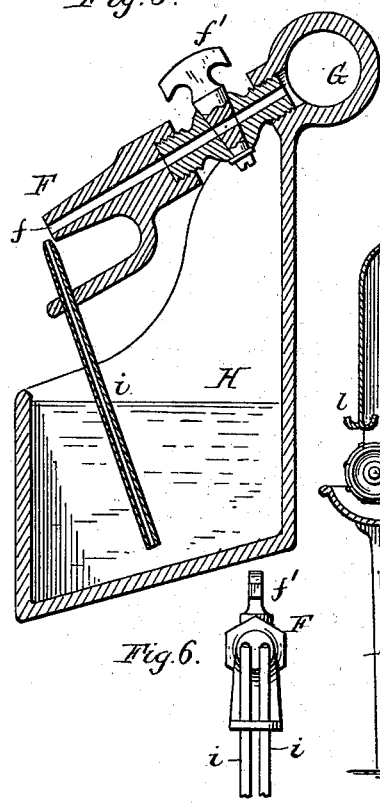
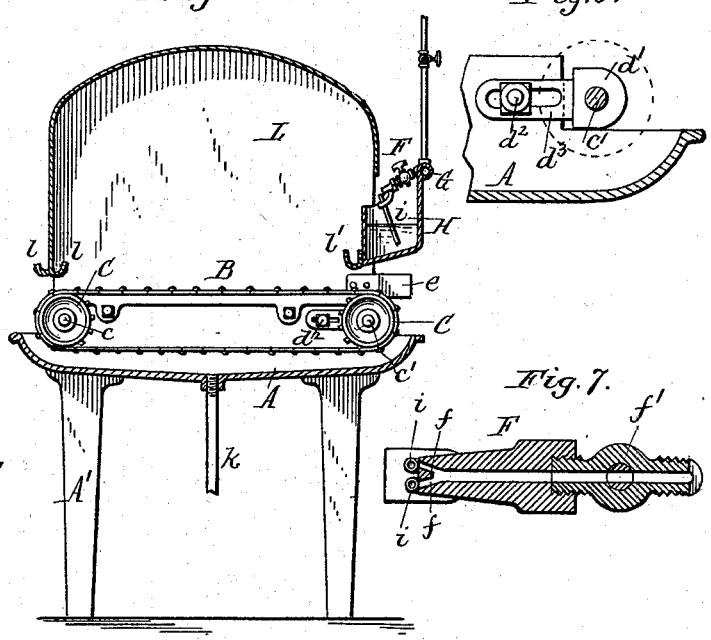
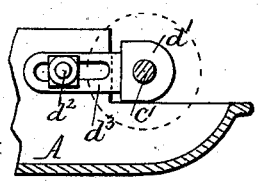
Witnesses: Emil Neuhart, Friedrich, Gustav, Wilhelm
J. W. Ruger Inventor
By Wilhelm Bonnet
Attorneys.

UNITED STATES PATENT OFFICE.

JAMES W. RUGER, OF BUFFALO, NEW YORK.

MACHINE FOR MOISTENING DOUGH.

SPECIFICATION forming part of Letters Patent No. 558,987, dated April 28, 1896.

Application filed September 4, 1891. Serial No. 404,785. (No model.)

*To all whom it may concern:*

Be it known that I, JAMES W. RUGER, a citizen of the United States, residing at Buffalo, in the county of Erie and State of New York, have invented new and useful Improvements in Machines for Moistening Dough, of which the following is a specification.

In order to impart a gloss to the surface of crackers, it is the custom to moisten or spray the dough with water after the same leaves the cracker-machine, in which it is rolled or cut into cakes of the desired size, and before the pans containing the dough are placed in the oven.

The object of my invention is the production of an efficient and convenient machine whereby the cakes of dough are uniformly sprayed preparatory to being baked.

Figure 1:
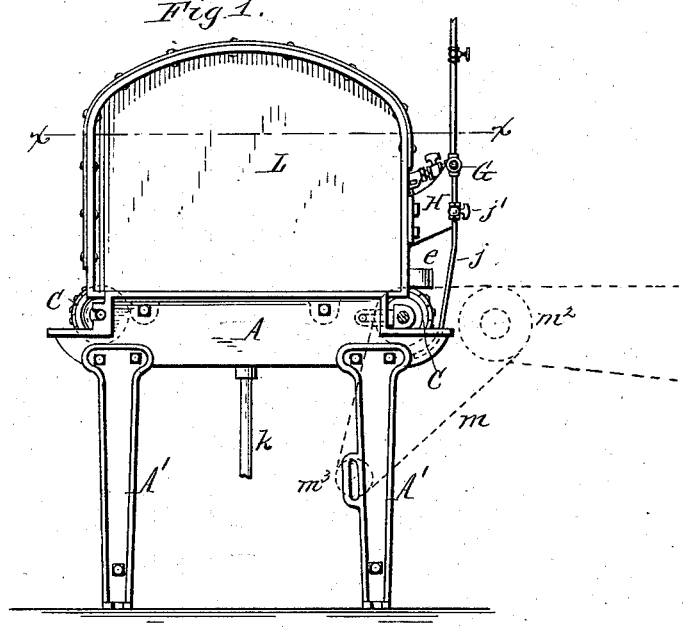
Figure 2:
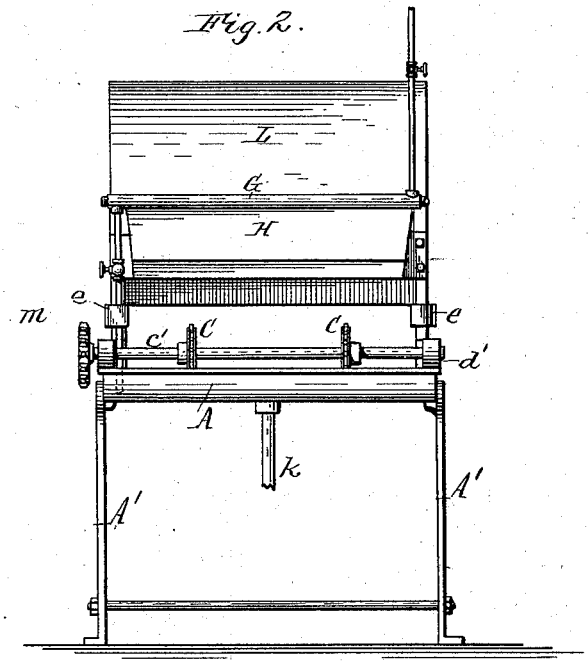

In the accompanying drawings, consisting of two sheets, Figure 1 is a side elevation of my improved machine. Fig. 2 is a front elevation thereof. Fig. 3 is a horizontal section of the same in line $x\ x$, Fig. 1. Fig. 4 is a vertical longitudinal section of the machine. Fig. 5 is a transverse section, on an enlarged scale, of the water-reservoir and one of the atomizers or spraying devices. Fig. 6 is a front view of one of the atomizers. Fig. 7 is a longitudinal section thereof at right angles to Fig. 5. Fig. 8 is a fragmentary longitudinal section of the trough forming the supporting-frame of the machine, showing the manner of journaling the rear shaft of the endless carrier. Fig. 9 is a similar view showing the means for tightening the endless carrier. Fig. 10 is a fragmentary horizontal section of the trough, showing one of the pan-guides.

Like letters of reference refer to like parts in the several figures.

The stationary frame of the machine consists of a metallic trough or shallow receptacle A, resting upon legs A', and which support the other parts of the machine.

B is a carrier arranged in the trough A and which receives the pans of rolled and cut dough from the cracker-machine, the delivery-apron of which is shown by dotted lines in Fig. 1. The carrier B preferably consists of endless chains or belts running horizontally around sprocket-wheels C, which are mounted upon transverse shafts $c\ c'$, journaled in the side walls of the trough A. The rear shaft $c$ is preferably arranged in horizontal notches $d$, formed in the side walls of the trough, as represented in Fig. 8, so as to be removable, and the front shaft $c'$ is supported in movable bearings $d'$, which are adjustably secured to said side walls by clamping-bolts $d^2$, passing through slotted arms $d^3$, which carry the front bearings, as represented in Fig. 9. The endless carrier is readily tightened by loosening the adjustable bearings, drawing the carrier taut, and again securing the bearings in place.

$e$ are guides arranged at the head of the endless carrier on opposite sides thereof for properly directing the pans upon the carrier as they come from the delivery-apron of the cracker-machine.

F are spray nozzles or pipes arranged at the front end of the machine above the head of the carrier and whereby water is delivered upon the dough in the pans resting upon the carrier for moistening the same. These nozzles are preferably constructed in the form of atomizers, which discharge the water in fine sprays or clouds, and each atomizer is provided with two oblique spray apertures or passages $f$, which diverge forwardly, as shown in Fig. 7, so as to direct the sprays laterally or obliquely instead of directly forward. By constructing the nozzles in this manner the sprays of the different nozzles cross each other, whereby the atomized water is more widely diffused over the dough and the latter is more uniformly moistened than if the sprays were directed lengthwise of the carrier. The nozzles of the atomizers are all connected with a horizontal steam-supply pipe G, and each nozzle is provided with a stop-cock $f'$. Steam is supplied to the pipe G from any available source, and the water of condensation collecting in said pipe is discharged through a drip-pipe $j$, having a cock $j'$, and terminating in the trough A.

By providing each atomizer with its own individual stop-cock the passage of the steam through each atomizer can be nicely regulated, so as to uniformly spray the crackers. This is an important feature of my machine, because the steam-pressure upon those atomizers remote from the steam-inlet is less than upon those near the inlet, so that if the atomizers had no individual stop-cocks and were all controlled by a single cock in the supply-pipe G they would not deliver uniform sprays; but the crackers within the spraying range of the atomizers near the steam-inlet would receive a greater amount of moisture than the crackers within the range of the atomizers remote from the steam-inlet, which would result in unevenly-baked crackers.

H is a water vessel or reservoir supported below the several spray-nozzles, and $i$ are the suction-pipes of the atomizers, which are immersed in the water-reservoir. The trough A has a drain-pipe $k$ for drawing off the water accumulating in the same.

L is a hood or housing arranged over the carrier B and which confines the sprayed water to the space above the carrier. This hood is formed in its front and rear walls with openings for the reception of the water-reservoir and the end portions of the endless carrier, as shown in Fig. 4.

$l\ l'$ are troughs or gutters arranged at the lower end of the rear wall of the hood L and the lower end of the reservoir H, respectively, and which catch the drippings or water of condensation trickling down the front and rear walls of the hood, thereby preventing such drippings from falling upon the dough. These gutters are inclined slightly, so as to discharge the drippings into the trough A on one side of the endless carrier. The water of condensation on the side walls trickles directly into the trough.

The endless carrier is driven from the delivery-apron of the cracker-machine with the same intermittent movement and at the same speed as the latter by a sprocket-chain $m$, running around sprocket-wheels $m'\ m^2$, secured, respectively, to the front shaft of the endless carrier and the rear shaft of the delivery-apron, and an idler $m^3$, journaled upon the frame of the spraying-machine.

The spraying-machine stands at the tail or discharge end of the cracker-machine, and the endless carrier B receives the pans containing the dough from the delivery-apron of the cracker-machine and conveys them to the rear end of the spraying-machine, where they are removed by the attendant and placed into the oven. In passing underneath the atomizers F the cakes of dough are moistened on their upper surface by contact with the atomized water, which latter fills the entire space above the carrier inclosed by the hood L, thus spraying the dough uniformly in a reliable and expeditious manner and enabling the crackers to be evenly and uniformly baked.

I claim as my invention—

1. In a machine for moistening dough, the combination with a trough or receptacle, of a carrier for the dough arranged in said trough, a spray-nozzle arranged above the carrier for delivering water upon the dough and a hood arranged over the carrier and provided with troughs or gutters which catch the water of condensation trickling down its walls, substantially as set forth.

2. In a machine for moistening dough, the combination with a trough or receptacle, of an endless carrier arranged in said trough, atomizers arranged above the head of the endless carrier, a steam-supply pipe with which said atomizers are connected and having a drip-pipe terminating in said trough, a water-reservoir arranged below said atomizers in which the suction-pipes of the latter are immersed, and a hood arranged over the endless carrier, substantially as set forth.

Witness my hand this 15th day of August, 1891.

JAMES W. RUGER.

Witnesses:
 JNO. J. BONNER,
 FRED. C. GEYER.